INVENTOR.
VERNON D. ROOSA
BY
Lindsey, Prutzman and Hayes
ATTORNEYS

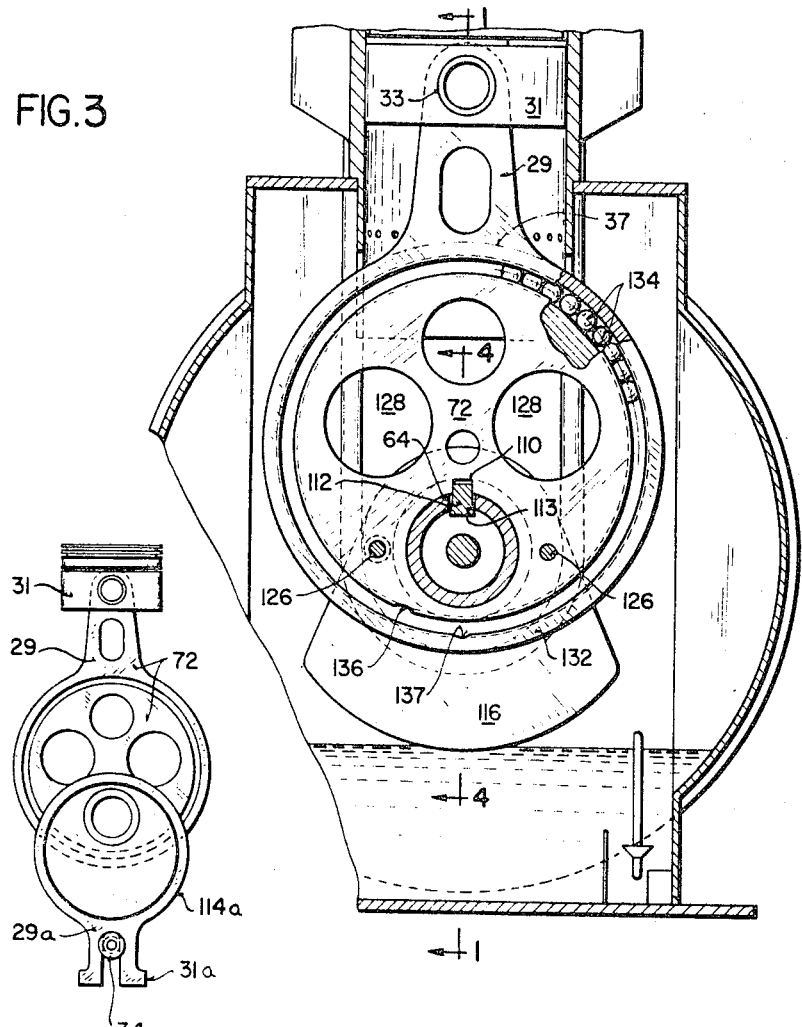
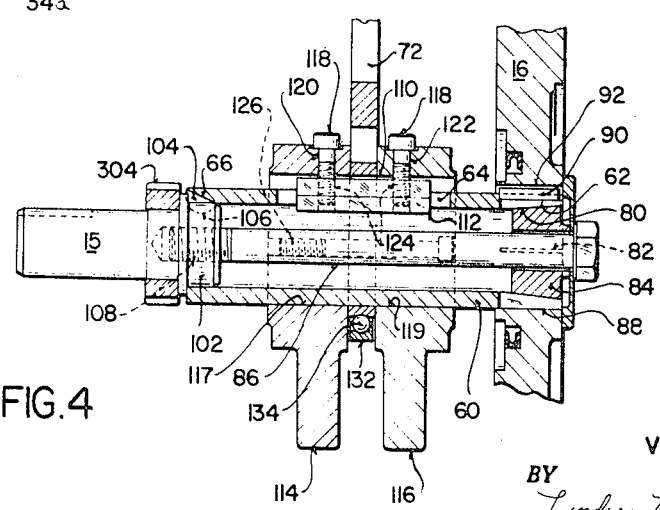

June 17, 1969   V. D. ROOSA   3,450,121
INTERNAL-COMBUSTION ENGINE AND FUEL INJECTION SYSTEM THEREFOR
Filed Feb. 13, 1967   Sheet 3 of 6

INVENTOR.
VERNON D. ROOSA
BY
*Lindsey, Prutzman and Hayes*
ATTORNEYS

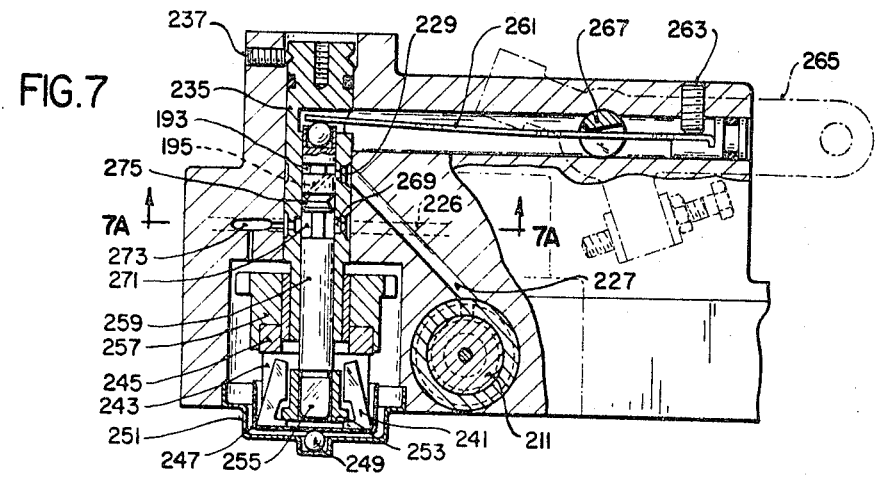
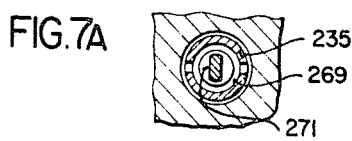
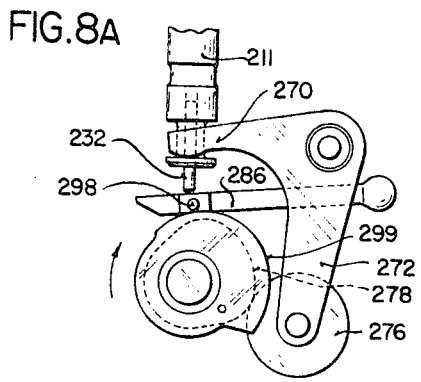
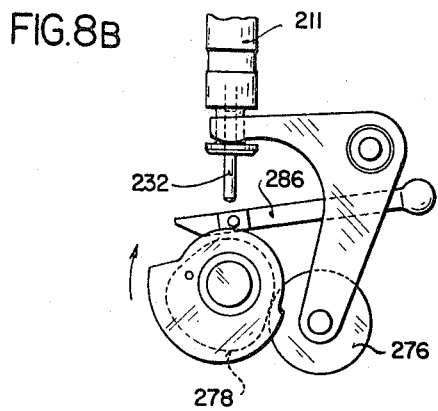
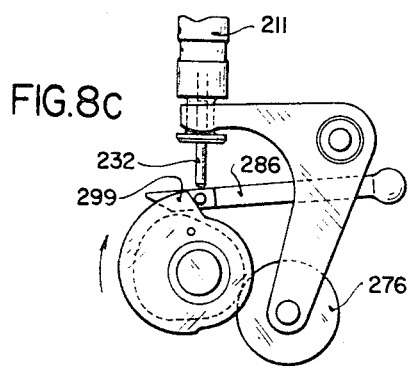

June 17, 1969  V. D. ROOSA  3,450,121
INTERNAL-COMBUSTION ENGINE AND FUEL INJECTION SYSTEM THEREFOR
Filed Feb. 13, 1967  Sheet 5 of 6

INVENTOR.
VERNON D. ROOSA
BY
Lindsey, Prutzman and Hayes
ATTORNEYS

FIG.11A
FIG.11B
FIG.11C
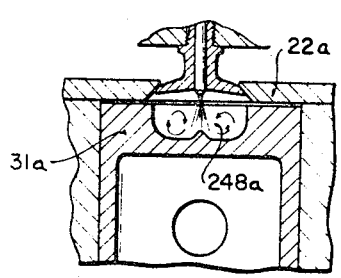
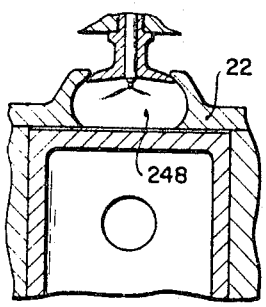
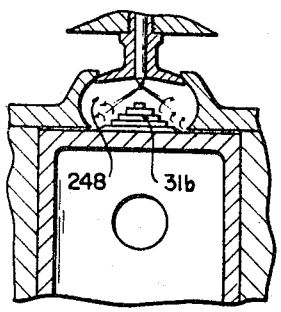
FIG.11F
FIG.11G
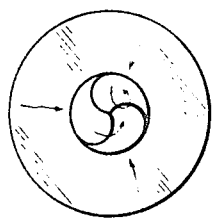
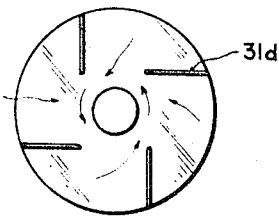
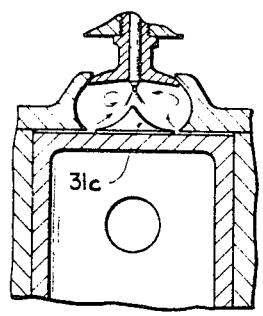
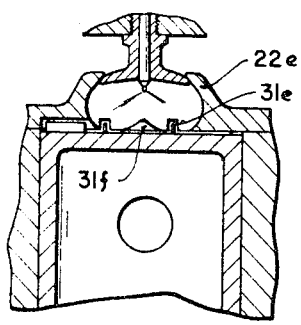
FIG.11D
FIG.11E

# United States Patent Office 3,450,121
Patented June 17, 1969

3,450,121
INTERNAL-COMBUSTION ENGINE AND FUEL INJECTION SYSTEM THEREFOR
Vernon D. Roosa, West Hartford, Conn. (% Hartford Machine Screw Co., P.O. Box 1440, Hartford, Conn. 06101)
Filed Feb. 13, 1967, Ser. No. 615,782
Int. Cl. F02m 39/02, 59/18; F02b 35/02
U.S. Cl. 123—140                               24 Claims

ABSTRACT OF THE DISCLOSURE

A new monovalve internal-combustion engine of a design specially adapted for screw machine manufacture and a novel fuel injection system therefor including a valve support requiring no lubrication, a combination pull rod and fuel conduit secured to a reciprocating member of a two stage injection pump with the pull rod and both pumps operated by a single compound cam arrangement, a fuel injection nozzle concentric with the valve and with the combustion chamber and having no flexible connections, a fuel injection subassembly integrated in a single housing mounted on the engine casing and including the throttle, governor, injection timing and torque controls, a fabricated piston rod assembly wherein the crankshaft bearing of the piston rod is greater than the throw of the crankshaft, a fluid seal between the piston and the cylinder against compression losses, a compression chamber which ensures an increasing turbulence of the charge in the cylinder with a maximum at top dead center, and a novel air blower and cleaner system including an arrangement for increasing the volumetric efficiency of the engine and the efficient purging of exhaust gases.

---

This invention relates to internal-combustion engines and has special significance to compression-ignition engines and to a simplified and novel fuel injection system and fabricated construction for such engines.

A principal object of the present invention is to provide a new and simplified fuel injection system for an internal combustion engine. Included in this object is the provision of a unitary fuel injection system subassembly packaging the throttle, governor, injection timing and torque controls.

A further object of the invention is to provide a reliable internal-combustion engine of simple construction and operation. Included in this object is the provision of a fuel injection system for an internal-combustion engine which is readily purged and pressurized prior to cranking for easy starting.

Another object of the invention is to provide a new and novel lightweight monovalve compression-ignition engine.

Still another object of this invention is the provision of a mounting and operating arrangement for a monovalve for an internal-combustion engine which does not require lubrication of the valve mechanism. Included in this object is the provision of a dual-function pull rod to operate the monovalve and to serve as a passage to carry fuel to the injection nozzle incorporated in the valve.

A still further object of the invention is to provide an engine provided with a power chamber with increased efficiency and which ensures a turbulent homogeneous charge condition in the power chamber at the time of ignition for efficient ignition and rapid flame propogation.

It is a further object of the invention to provide a novel fabricated crankshaft construction suitable for screw machine manufacture. Included in this object is the provision of a crankshaft and connecting rod design incorporating a novel static and dynamic balancing arrangement.

Another object of the invention is to provide a novel arrangement for providing cooling and cleaned combustion air for the engine and for purging the exhaust gases from the vicinity of the monovalve. Included in this object is the provision of an arrangement for increasing the volumetric efficiency of the engine.

Other objects will be in part obvious and in part pointed out more in detail hereinafter.

The invention accordingly consists in the features of construction, combination of elements and arrangement of parts which is exemplified in the construction hereafter set forth, and the scope of the invention is indicated in the appended claims.

In the drawings:

FIG. 3 is a further enlarged fragmentary cross-sectional view taken along the lines 3—3 of FIG. 2;

FIG. 3A is a fragmentary cross-sectional view generally similar to FIG. 3 on a reduced scale illustrating a modified crankshaft structure incorporating means for dynamically balancing the crankshaft at high speeds;

FIG. 4 is a fragmentary sectional view taken along the lines 4—4 of FIG. 3 and showing the crankshaft assembly in more detail;

FIG. 7 is an enlarged fragmentary sectional view taken along lines 7—7 of FIG. 6 and showing the governor and throttle control of the fuel injection system;

FIG. 7A is a cross-sectional view taken along lines 8—8 of FIG. 7 and showing the rotating metering valve of the governor;

Figure 1:
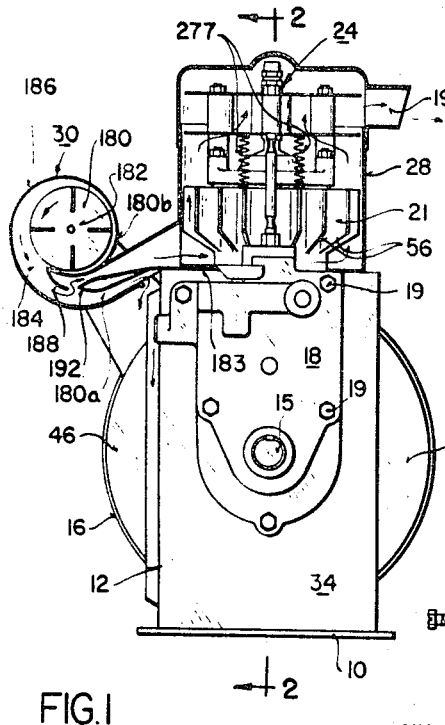
FIG. 1 is a front end view, partly in section, of an embodiment of an internal-combustion engine incorporating the present invention.
Figure 9A:
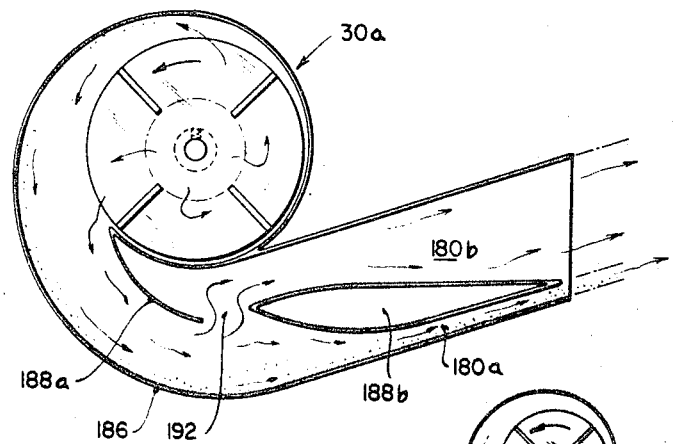
Figure 9B:
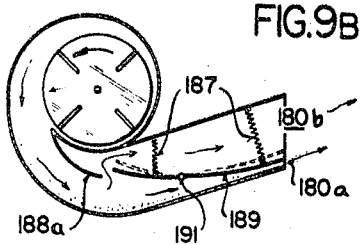
Figure 10A:
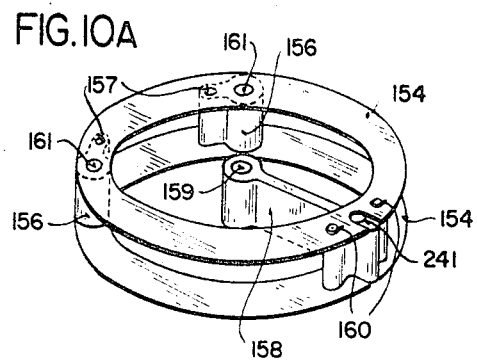
Figure 10B:
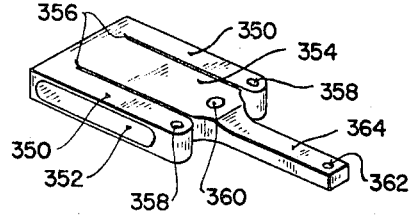
Figure 10C:
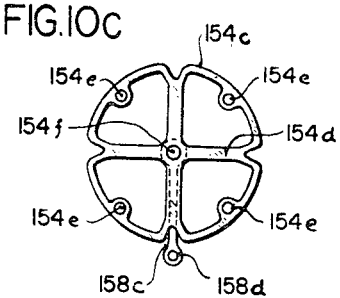
Figure 10D:
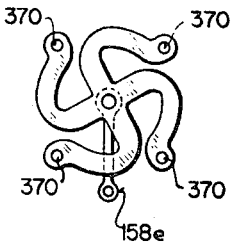
Figure 10E:
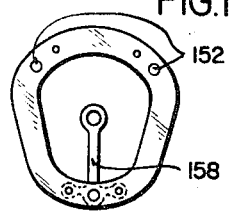

FIGS. 8A, 8B, and 8C illustrates the operation of the pull rod and the high pressure injection pump by the composite cam at various stages of the engine cycle;

FIG. 9A is an enlarged cross-sectional view of the blower and air cleaner for the engine of FIG. 1;

FIG. 9B illustrates a modified form of the blower and air cleaner;

FIG. 10A is a perspective view of the monovalve support and fuel conduit assembly used in the illustrated embodiment of the engine;

FIG. 10B is a perspective view of a modified form of the monovalve support and fuel conduit assembly;

FIGS. 10C, 10D and 10E are top views which illustrate modified forms of monovalve support and fuel conduit assemblies for the engine;

FIGS. 11A, 11B, 11C, 11D and 11E are each fragmentary cross-sectional views of the engine showing different combustion chamber configurations for use in the monovalve cylinder design of this invention; and FIGS. 11F and 11G are top views of the pistons of FIGS. 11D and 11E respectively.

Referring now to the drawings in detail, in which like numerals refer to like parts throughout the respective views, an embodiment of a rotary internal-combustion engine illustrating the present invention is shown in FIG. 1 as having a base 10 on which an engine casing 12 is mounted.

A crankshaft 14 has a stub shaft 15 extending through one wall of the engine casing and mounts a flywheel 16 (FIG. 2) adjacent the opposite wall of the engine casing.

A housing 18 incorporating a fuel injection system subassembly is secured to the casing 12 by bolt 19 with the stub shaft 15 extending therethrough.

A cylinder sleeve 20 having external fins 21 is mounted in an aperture 23 in the top of the engine casing 12 with peripheral shoulder 27 of sleeve 20 in engagement with the top of casing 12. A cylinder head or cap 22 and a combined monovalve and injection nozzle assembly 24 is mounted concentrically with valve seat 25 of the engine by a monovalve support and fuel conduit assembly 26. An inverted generally cup-shaped cover or shroud 28 for directing and confining the cylinder cooling and combustion air delivered by an air blower and cleaner 30 encases the cylinder, the cylinder head and monovalve support assembly 26.

Figure 2:
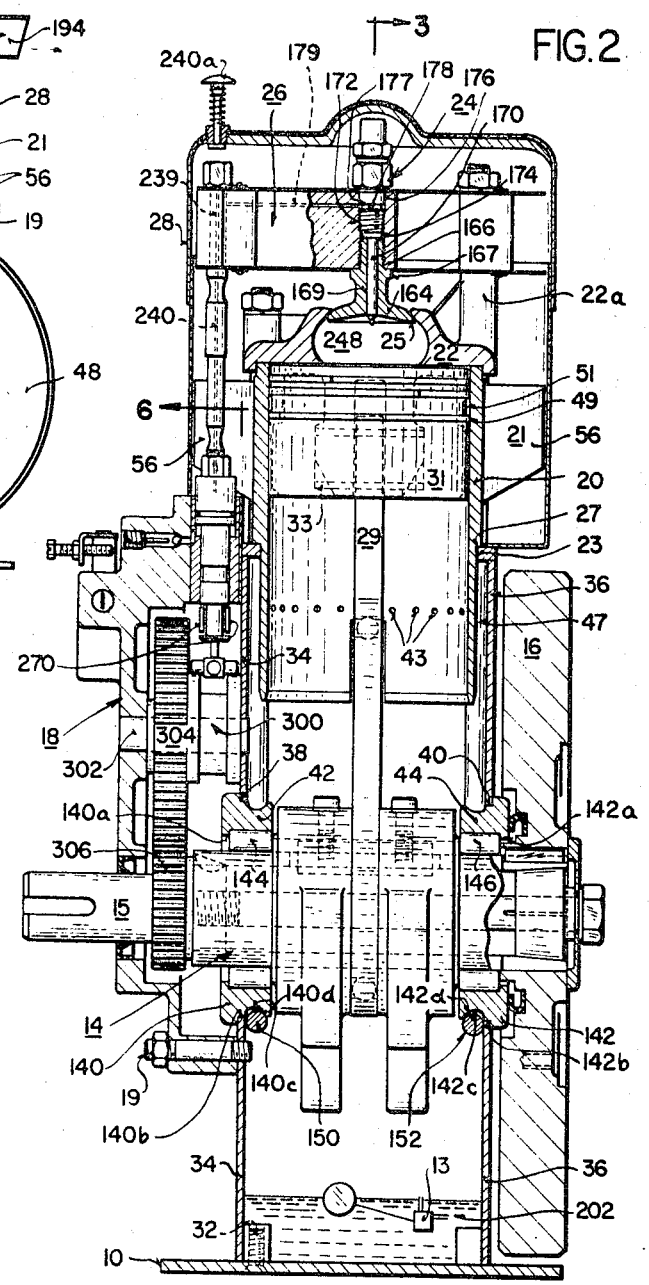
FIG. 2 is an enlarged transverse section view of the engine taken along the lines 2—2 of FIG. 1.
Figure 5:
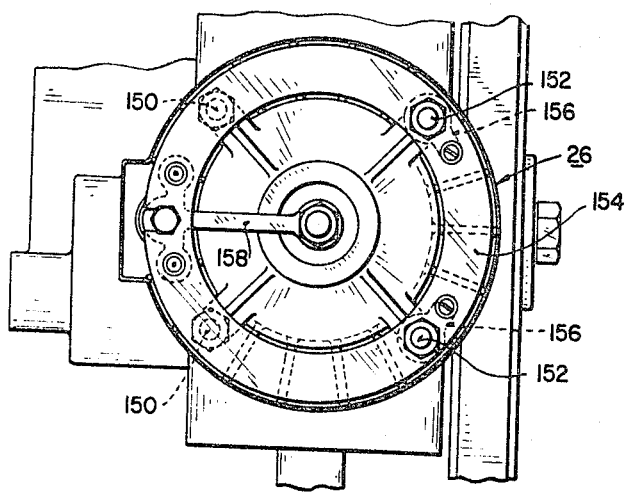
FIG. 5 is a fragmentary top view of the engine of FIG. 2 with the top shroud removed.

The engine casing 12, as best shown in FIGS. 1, 2 and 3 comprises a generally rectangular fabricated housing, the lower end of which is secured in sealed relation to the base 10 by any suitable means such as screws 32 to provide a crankcase for the engine. The generally parallel side walls 34, 36 are provided with aligned apertures 38, 40 which receive the external bearing members or races 42, 44 of antifriction bearings mounting the crankshaft 15 as hereinafter more fully described.

The other pair of diametrically opposed sides of engine casing 12 are provided with arched channels 46, 48 (FIG. 1) disposed in a plane perpendicular to the crankshaft 14 to pass the crankshaft bearing of connecting rod 29 as the crankshaft rotates. The upper end of connecting rod 29 is pivotally connected to piston 31 by wrist pin 33.

Referring particularly to FIG. 4, the crankshaft 15 comprises a tubular sleeve 60 which may be fabricated from any suitable material such as a length of tubular steel.

The sleeve 60 is provided with axially aligned and spaced apart keyways 62, 64, 66 for respectively mounting the flywheel 16, an eccentric crank plate 72, and the stub shaft 15. The flywheel end of the tubular sleeve 60 is further provided with an internal conical surface 80 and is segmented by a plurality of axial slits 82. A mating cone 84 engageable with the internally tapered surface 80 of the sleeve 62 wedges and expands the end of sleeve 62 into tight engagement within the bore 88 of the flywheel 16. A key 90 is positioned in keyway 62 and a mating keyway 92 of the flywheel 16 to align and maintain the flywheel in a prescribed angular relationship with respect to the sleeve 60.

The stub shaft 15 is provided withh a cylindrical end 102 which is closely received in the other end of the sleeve 60 with a sliding fit and is keyed thereto by a half moon key 104 positioned in keyway 106 of cylindrical end 102 to maintain it in a prescribed angular relationship relative to the sleeve 60 and the flywheel 16. A threaded axial bore 108 in the inner end of stub shaft 15 threadably receives tension bolt 86 to assemble and maintain the flywheel and stub shaft to sleeve 60.

As best shown in FIG. 3, the eccentric plate crank 72 is provided with a keyway 110 which is centered on a line between the center of sleeve 60 and its own center. A pair of counterweights 114, 116 are mounted on opposite sides of the eccentric plate crank 72 and are respectively provided with bores 117, 119 which closely and slidably engage the external wall of sleeve 60. A pair of axially extending screws 126 are provided to clamp the eccentric cone 72 tightly between the pairs of counterweights 114, 116 and to locate the counterweights in a position to counterbalance the rotational weight of the mass of the eccentric plate crank 72 and the portion of the connecting rod 29 below dotted line 37 of FIG. 3. A key 112 having a lower wedge shaped portion 113 is positioned with the wedge shaped portion 113 engaging keyway 64 of the sleeve 60. A pair of screws 118 received in apertures 120, 122, respectively, of the counterweights 114, 116 threadably engage threaded bores 124 in the key 112 to wedge the tapered portion 113 thereof into tight engagement with keyway 64 of eccentric plate crank 72. As shown, the eccentric plate crank 72 is provided with a plurality of apertures 128 to reduce the weight thereof and to minimize the required weight of counterbalances 114, 116. By this construction, eccentric plate crank 72 is clamped in a plane radial to the sleeve 60 by counterbalance 114, 116 and bolts 126, with the point of maximum eccentricity thereof in diametrically opposed relation to the centers of gyration of counterbalances 114, 116 and rigidly secured in precise angular position relative to the sleeve 60 by the tapered key 112.

The connecting rod, which is of less width than eccentric plate crank so as to pass freely between counterweights 114 and 116 as the crankshaft 14 rotates, is provided with an integral bearing portion 132 at the lower end thereof (FIG. 3) which encircles the eccentric plate crank 72, and, as shown, forms the peripherally grooved outer race of an antifriction bearing shown as having balls 134 with the grooved outer periphery of the eccentric plate crank 72 forming the inner race of the bearing. The balls 134 may be assembled between the inner and outer races by aligning notch 136 in the eccentric plate crank 72 with notch 138 of the piston rod bearing portion 132 respectively.

With this construction of crankshaft 14 and connecting rod 29 in which the mating bearing surfaces thereof have a greater radius than the throw of the crankshaft, an arrangement is provided wherein the unbalanced portion of the connecting rod 29 is minimized thereby minimizing the dynamic unbalance of the connecting rod.

FIG. 3A illustrates a modification of the crankshaft and connecting rod assembly wherein the counterweights are formed with cylindrical peripheral surfaces which are eccentrically disposed relative to the axis of rotation of the crankshaft 14. The point of maximum eccentricity of the identical eccentric balance weights 114a, 116a is dimetrically opopsed in relation to the point of maximum eccentricity of the plate crank 72. A reciprocating arm 29a having an integral bearing engages the outer periphery of each of the eccentric counterweights 114a, 116a, and is provided with a weighted head portion 31a to counterbalance the upper end of the connecting rod 29 and the piston 31.

The arm 29a of each of the counterweights is slotted axially at 33a to receive bolt and bearing assembly 34a which is fixedly secured to the wall 34 of the casing 12 on the axis of reciprocation of piston 31. The bearing assembly 34a has washers on each side of arm 29a to maintain the arm 29a in the plane of the associated eccentric counterweight. The reciprocating arm 29a engaging balance weight 116a is similarly secured to wall 36. This construction enables the connecting rod 29 to pass between the arms 29a. The amount of eccentricity of the counterweights 114a, 116a as well as the mass of the weighted heads and arms 29a may be readily calculated to provide for the dynamic balancing of the portion of connecting rod 29 and piston 31 not balanced by the counterweight cams 114a, 116a.

The piston and crankshaft assembly of FIGS. 3 and 4 is assembled by first assembling the piston 31, the connecting rod 29 with the eccentric plate crank 72 which is then clamped between the counterweights 114, 116 by bolts 126. This assembly is then inserted through the bottom of the engine casing 12 before the base 10 is applied thereto. Sleeve 60 is then inserted through either of the apertures 38, 40 of the engine casing and through the aperture in the counterweights 114, 116 and eccentric plate crank 72. Key 112 is then inserted through the bore of sleeve 60 and secured to the counterweights 114, 116 by screws 118 which draw the wedge portion 113 of the key 112 into tight engagement with the edges of keyway 64 to clamp the plate crank 72 and counterweights 114, 116 tightly against the sleeve 60.

Referring to FIG. 2, ring members 140 and 142, which serve as outer races for the bearings supporting the crankshaft 14, are respectively assembled over the ends of crankshaft sleeve 60 with the rollers 144, 146, respectively, in place between the outer surface of the sleeve 60 and the ring members 140, 142, respectively. The ring members 140, 142 are respectively provided with inwardly turned flanges 140a and 142a to maintain the respective rollers against axial movement from their assembled position and are further provided with peripheral annular shoulders 140b and 142b which are closely received in the respective apertures 38, 40 of the casing 12.

With the half-moon key 104 and key 90 positioned in their respective slots, the stub shaft 15 and the flywheel 16 are mounted on the respective ends (FIG. 2) of crankshaft sleeve 60 and with the clamping bolt 86 and cone 84 asembled, the bolt 86 is tightened to complete the assembly of the crankshaft.

As shown in FIG. 2, the annular rings 140, 142 are respectively provided with annular peripheral grooves or recesses 140c and 142c located inside the side walls 34 and 36 of the engine casing 12. The innermost peripheral walls 140d and 142d of the grooves 140c, 142c are tapered and so spaced relative to the adjacent side walls 34, 36 of the engine casing 12 that, upon tightening the U-bolts 150 and 152, the annular rings 140 and 142 are drawn axially toward each other so as to be tightly wedged against the side walls of the housing. The rollers 140a and 142a are respectively engageable with the sides of counterweights 114, 116 to prevent the axial movement of the crankshaft 14.

The monovalve support and fuel conduit assembly 26 (FIGS. 1, 2, 5 and 10A) comprise a prefabricated subassembly shown in FIG. 10A and includes a pair of identical resilient ring members 154 formed of spring material such as beryllium copper. The ring members 154 are preassembled in superposed parallel spaced relationship with angularly spaced spacers 156 secured therebetween by fasteners such as screws 157. A spacer and valve support arm 158 is likewise fixed between ring members 154 by fasteners or screws 160 with the arm 158 projecting radially inwardly and in a direction to intersect the arc between the spacers 156. The arm 158 is provided with a vertical bore 159 disposed at the center of the rings 154.

The spacers 156 and the rings 154 are provided with vertical apertures 161 which, as best shown in FIG. 2, receive the ends of U-bolt 152 to mount the monovalve support and fuel conduit assembly 26 in concentric and overlying and parallel relation relative to cylinder head cap 22 and spaced therefrom by the apertured integral studs 22a of cap 22. By this arrangement, the portion of the ring members 154 mounting the valve support arm 158 is free to move vertically against the bias of the spring members to move the apertured end thereof 159 in substantial rectilinear movement.

The combination monovalve and nozzle assembly 24 is mounted by the free end of the valve support arm 158. Since the valve support arm 158 mounting the valve and injector assembly 24 is free to move up and down but the arm 158 is rigidly supported by the parallel ring members 154, the vertical movement of the arm 158 is effected with the arm remaining parallel to its initial position to guide the valve and injector assembly 24 for reciprocating movement without the use of the customary guide sleeve in which a stem for the valve is slidable. Accordingly, this invention eliminates top lubrication. In addition, the elimination of the need for the physical space required for a valve sleeve reduces the head room required for an overhead valve mechanism and increases the available area for the entrance of combustion air into and the discharge of spent combustion gases from the combustion chamber and increases the volumetric efficiency of the engine.

Moreover, by placing the monovalve and injection nozzle assembly 24 at a position midway between the portion of the rings 154 fixed at 161 and the movable portion at 160 to which arm 158 is fastened, any expansion of the valve support 126 is automatically compensated for to maintain the valve assembly 24 aligned with valve seat 25.

The combination monovalve and injection nozzle assembly 24 is constructed and arranged to facilitate the easy removal of the injection nozzle portion for inspection or replacement without the removal of the valve portion. As shown in FIG. 2, the assembly 24 comprises an annular valve 164 which seats on the valve seat 25 and serves to admit combustion air and to exhaust spent combustion gases. The truncated end 166 of the valve closure 164 is provided with an annular shoulder 167 and is threaded at its end 168 to threadably engage the mating threads of the bore 159 of the valve support arm 158. The stem of the valve 164 is provided with a concentric aperture 169 to removably receive the body of the fuel injection nozzle 170. Nozzle 170 is provided with a peripheral threaded portion 172 which likewise engages the mating threads of bore 159 of arm 158 and is sealed thereto by any suitable means such as sealing rings 174 and 176 with the tip of the nozzle projecting into the combustion chamber 248.

With the combination monovalve and nozzle assembly coupled with its support arm as described above, the valve and injection nozzle may both be disposed concentrically with respect to the combustion chamber to admit air and fuel thereto so as to distribute it uniformly within the combustion chamber for efficient ignition and rapid and uniform flame propagation.

The injection nozzle 170 utilized in the practice of this invention is preferably of the inwardly opening fuel pressure operating type such as disclosed in my pending patent application Ser. No. 609,147 filed Jan. 13, 1967 and entitled "Nonleak-off Fuel Injection Nozzle." In this type of nozzle, the valve plunger is lifted from the valve seat by the high pressure of the fuel within the nozzle body to discharge a pulse of fuel into the combustion chamber whereupon the fuel pressure in the nozzle drops and the valve closes. In the nonleak-off nozzle of the aforementioned application, no conduit connected to the nozzle for conducting leakage fuel from the nozzle is required.

As shown in FIG. 2, and hereinbefore described, the nozzle utilized in the practice of this invention is provided with an annular groove 177 which communicates with high pressure fuel passage 179 in valve support arm 158. The one or more inlet ports 178 positioned in the bottom of the groove 177 communicates with the interior of the nozzle body to conduct the high pressure fuel thereto to operate the nozzle as more fully described in the aforementioned patent application.

Referring again to FIG. 2, the piston 31 is provided with a bifurcated concentrically disposed boss 34 projecting from the top surface of the piston 31 within the skirt portion thereof. The bifurcated boss is apertured to receive the wrist pin 33 to connect the piston rod 29 thereto. With this construction, the forces imposed on the piston by the combusting gases is transmitted directly from the top surface of the piston 31 to the connecting rod through the bifurcated boss 35 rather than imposing stresses on the skirt portion of the piston 31. Moreover, where the wrist pin engages a bearing surface in bosses on the skirt portion, the skirt portion is made egg-shaped to accommodate differential expansion and prevent seizure.

Another feature of the design is the provision of a fluid seal against compression losses from the piston. As shown in FIG. 2, the lower portion of the cylinder sleeve 20 is provided with a plurality of apertures 43 about the periphery thereof. Since the cylinder sleeve 20 is spaced from the walls of the engine casing 12, the rotating crank will splash oil into the peripheral space 47 to effectively cool the cylinder sleeve 20 and the piston 31. A portion of such oil will also pass through the apertures 43. The lower ring 49 of the piston is preferably formed of a resilient plastic material having a low friction bearing surface and capable of withstanding the heat of the engine. Polytetrafluoroethylene (i.e. Teflon) is a material suitable for this purpose. Piston 31 is provided with an annular groove 51 above the ring 49, and when the piston is in the lowest point of its stroke, the annular groove 51 registers with the apertures 43 whereupon the oil passes through the apertures 43 to fill the groove 51 and is retained therein by the ring 49 as the piston moves upwardly to form a liquid seal. This also provides positive lubrication for the upper cylindrical walls and further assists in cooling the piston 31.

The air blower and cleaner 30 comprises a vaned rotor 180 enclosed in a shroud 181 having an axial inlet opening 182 and a radial discharge passage 184 and may be driven in any suitable manner as by a belt drive from the crankshaft, not shown. The centrifugal force imposed on the air by the vaned rotor 180 causes any heavy particles entrained in the air to become concentrated along the outer peripheral wall 186 which is in the form of a volute. A baffle 188 divides the discharge passage 180 into two separate passages 180a and 180b and directs the portion of the air containing the heavy particles through passage 180a below the divider plate 183 positioned on the top of the engine casing 12 to cool the engine casing. The baffle 188 is provided with an intermediate port or aperture 192 through which the cleaned portion of the air passes into passage 180b as shown by the arrows in the drawings.

As best shown in FIG. 9, the leading portion 188a of the baffle 188 upstream from the aperture 192 has a trailing edge which extends further toward the outer wall 186 of the air blower and cleaner 30 than does the leading edge of the trailing baffle portion 188b. The clean air entering passage 180b must change its direction to move radially inwardly away from the wall 186 thereby further improving the separation of unwanted particles from the air.

The clean air enters the lower portion of the shroud 28 above the divider wall 183 and passes between the fins 56 over the cylinder cap 22 to cool the top of the engine. The cooling air and the spent exhaust gases entrained therein exit from the hooded shroud 28 through discharge port 194 from whence they may be discharged directly into the atmosphere or into a muffler, not shown. The discharge port 194 is positioned above the lower of the annular rings 154 (FIG. 1) which are spaced closely to the wall of the shroud 28 to restrict the free passage of the air therebetween. Thus, the cooling air is directed through the center of ring 154 adjacent the valve. As the air passes the valve 164 when the valve is open during the intake stroke, a portion will enter the combustion chamber 248. During the exhaust stroke, the air will entrain the spent combustion gases being discharged from the combustion chamber to efficiently remove the gases from the vicinity of the valve.

The size of the discharge port 194 may be sized (or otherwise constructed) to throttle the air and maintain an above atmospheric pressure within the shroud 28 to improve the volumetric efficiency of the engine.

FIG. 9B shows a slightly modified form of the air cleaner and separator wherein the downstream portion of the baffle is in the form of a spring-biased movable divider 189 pivoted on axis 191 and biased to a neutral position by springs 187 to provide an automatic adjustment between the discharge air passing through passage 180a and 180b and for shifting the leading edge of the divider 189 relative to the trailing edge of the leading baffle portion 188a to maintain the efficiency of the cleaner under various air flow conditions.

Figure 1A:
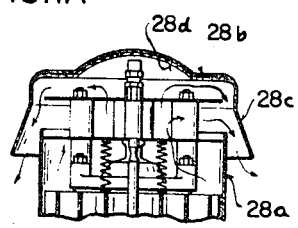
FIG. 1A is a fragmentary front end view similar to FIG. 1 illustrating a modified arrangement for discharging and muffling the exhaust gases and cooling air.

FIG. 1A shows a modified form of a shroud for the engine. In this form, the shroud is provided with a lower cylindrical portion 28a encircling the finned cylinder sleeve 21 and extending to a point above the lower of the ring members 154 to direct the cleaned air passing over the upper portion of the engine in the same manner hereinbefore described. The upper portion of the shroud 28b is shown as being a separate member secured in position in any suitable manner and having a cylindrical depending side portion 28c which overlaps the upper surface of the sleeve portion 28a. The interior of the vertical cup-shaped member 28b is lined with a layer of sound insulating material 28d to deaden and baffle the noise generated by the engine.

The housing 18 for the fuel injection subassembly is mounted on the shaft end of the engine casing 12 shown in FIGS. 1 and 2, and is sealed thereto in any suitable manner such as a gasket.

Figure 6:
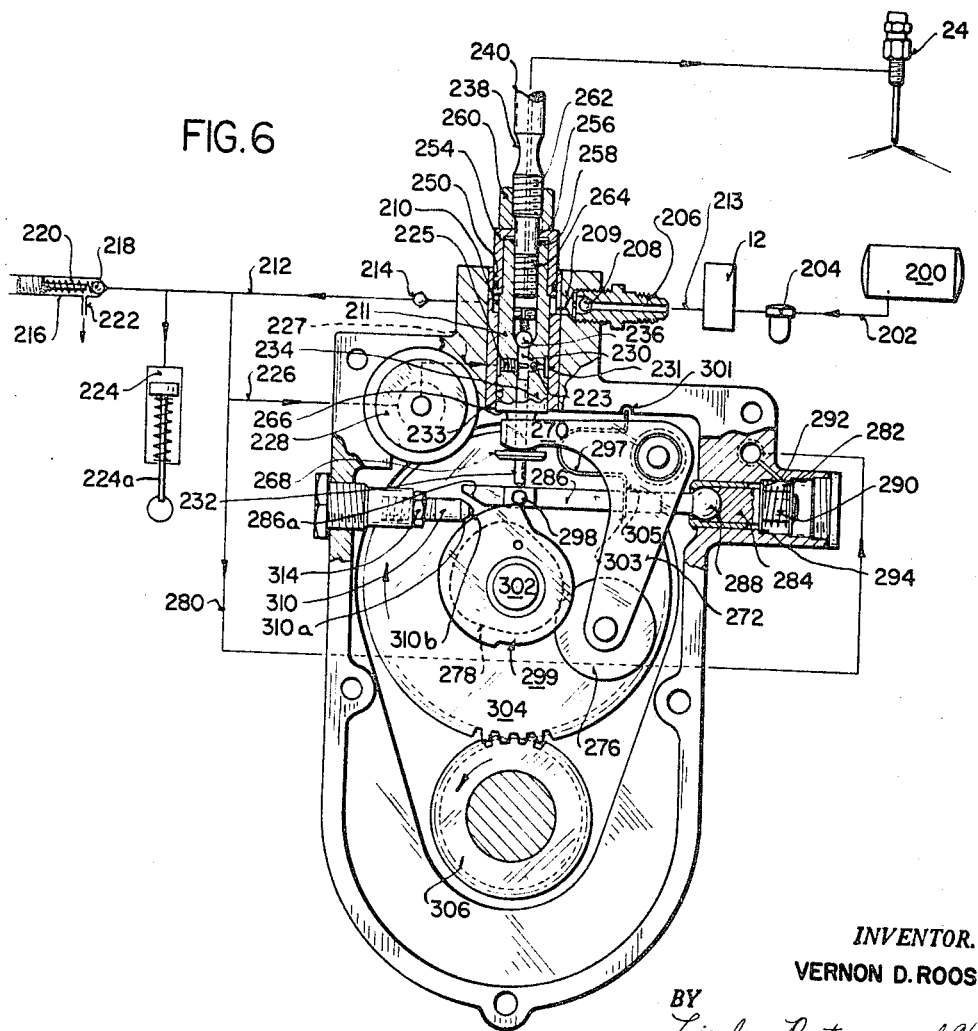
FIG. 6 is an enlarged fragmentary sectional view of the fuel injection system and subassembly taken along line 6—6 of FIG. 2.

Basically, and as illustrated by FIGS. 2 and 6, the fuel system comprises a fuel tank 200 from which fuel flows through conduit 202 and a filter 204 to a float valve 13 in the crankcase formed by the casing 12 of the engine. From float valve 13 the fuel passes to an inlet 206 which, as shown, includes an inlet ball check valve 208 having a perforated stop washer 209 to limit the movement of ball 208 through a conduit 213. The float valve 13 is a three-way valve which admits fuel oil to the crankcase from the tank 200 to maintain the desired level of fuel therein for lubrication purposes and passes fuel through conduit 213 to the inlet 206 from the tank 200 or the crankcase dependent on whether the crankcase level is above or below the prescribed level determined by the float valve.

From the inlet 206 the fuel passes into an annular pumping chamber 210 formed by a sleeve 211 of housing 18 where the fuel is pressurized to a low pressure correlated with engine speed as hereinafter more fully described.

From annular pumping chamber 210 the fuel passes through a conduit or passage 212 which includes a one-way valve 214 and is connected to a pressure regulating valve 216. The pressure regulating valve 216, shown schematically, comprises a spring-biased ball 218 in a tapered seat 219, the biasing spring 220 of which is adjusted to permit the valve to become unseated at a specified minimum pressure, say, 26 p.s.i. After the ball 218 is unseated, the valve 216 regulates the pressure in the conduit 212 by the restriction offered by orifice 222 and the throttling of the passage of fuel between the tapered seat 219 and the ball 218 to provide a pressure which increases with increased speed.

An accumulator 24, hereinafter more fully described, is connected to conduit or passage 212 to minimize the fluctuations in the pressure in conduit 212 despite the pulsating output of pumping chamber 210. The fuel under regulated pressure passes from conduit 212 to conduit 226 and thence to governor 228 which controls a metering valve 229 (FIG. 7) for metering the fuel.

Referring now particularly to FIG. 7, the governor 228 comprises a sleeve 235 fixedly secured in a bore of the housing 18 by a setscrew 237. A plurality of governor weights 241 are angularly spaced within a cup-shaped thrust cap 247 by fingers 243 of annular cage 245. The cap 247 encloses the weights 241 and is supported against axial movement by a ball 249 which engages an end cap 251 received in the housing 18 by a press fit. The centrifugal force acting on the weights 241 causes them to pivot outwardly and exert an axial force on a sleeve 253 which is provided with a noncircular aperture to receive the mating end 255 of governor valve 259 to provide a driving connection therebetween.

The cage 245 is mounted to rotate with a gear member 257 which having teeth 259 engages the teeth of cam gear 304 (FIG. 6) to be driven thereby. The opposite end of the governor valve 259 is biased by a leaf spring 261 which is secured in position by setscrew 253. The rotation of throttle arm 265 causes the cam 267 thereof to vary the biasing force of leaf spring 261 to set the governor speed.

As indicated above, the fuel enters the governor through a passageway 226 and enters an annulus 269 provided by the sleeve 235. A noncircular portion 271 (FIG. 7A) provides a cavity with sleeve 235 which registers with annulus 269 to provide for the continuous flow of fuel required by the engine. The noncircular cross section of portion 271 serves as a centrifugal separator to separate any heavy particles entrained in the fuel and cause them to pass through a discharge port 273 bypassing the metering valve 229. The radial end wall of the cavity provided by the flats 271 of the governor valve 259 is provided by flange 275 which is spaced from the bore of the sleeve 235 providing a restricted annular passage therebetween to further assist in the separation of entrained particles from the fuel passing axially through this restricted passage which communicates with an annulus 193 through a passageway 195.

Suffice it to say, that as centrifugal force increases due to increased speed, the governor weights 241 urge the governor valve 259 upwardly as viewed in FIG. 7 to reduce the size of the metering valve 229 to govern the speed of the engine.

The metered fuel from the governor 228 enters pumping chamber 230 of the high pressure charge pump passage 227, annulus 231 and past inlet ball check 228 having maximum lift stop 225.

The high pressure charge pump comprises the injection plunger 232 which is slidable relative to sleeve or cylinder 234 which in turn is slidable axially relative to bore 233 in sleeve 211 of housing 18. A charge of fuel pressurized in pumping chamber 230 as hereinafter more fully described, exits past one-way valve, or ball check, 236 located in the passage connecting the pumping chamber 230 with delivery passage 238 of the valve actuating rod 240 (FIGS. 2 and 6), the upper end of which communicates with sealed passage 239 formed between the bore 241 (FIG. 10a) and valve actuator rod 240. The highly charged pulse of fuel delivered by the charge pump then passes through passage 179 of monovalve support arm 26 to an annular groove 177 surrounding the injection nozzle 24 and through inlet port 178 into the injection nozzle 24 whence it is injected into the combustion chamber 248.

In order to pressurize the fuel in conduit 212 to a pressure correlated with engine speed, an inverted cup-shaped plunger or sleeve 254 is slidably received within the passage 250. The end wall of the cup-shaped plunger is apertured at 256 to receive the valve control rod 240 and is secured in sealed relation against shoulder 258 of reciprocating sleeve or cylinder 234 by a cap nut 260 which threadably engages the threads 262 on the valve control rod 240. It will thus be seen that as the valve control rod 240 is raised and lowered, the volume of annular pumping chamber 210 will change to produce a pumping action.

The valve control rod 240 is provided with a further threaded end portion 264 of reduced diameter which threadably engages the mating threads of the reciprocating sleeve 234, and it will be understood that this threaded engagement provides for the adjustment of the opening of monovalve 24.

The lower end of reciprocating sleeve 234 is provided with an annular peripheral recess between the shoulder 266 and the end flange 268 thereof to receive the end 270 of crank 272 which, as shown in FIG. 2, is bifurcated to straddle the necked down portion 274 of the sleeve 234.

The other end of crank 272 comprises a rotatable roller 276 which engages the center cam 278 (FIG. 2) of compound cam assembly 279 to operate to drive the crank 272 in timed relation relative to the engine and reciprocate sleeve 234 and valve control rod against the bias of resilient ring members 156. If desired compressions springs 277 (FIG. 1) may be provided between cylinder cap 22 and monovalve support 26 to provide an upward bias on the monovalve support or to assist the upward bias of ring members 156.

Referring again to FIG. 6, it will be observed that passage or conduit 280 is connected to a chamber 282 in the housing 18 of the fuel injection subassembly to deliver the regulated pressure from conduit 212 thereto. The pressure in chamber 282 acts against the bias of a spring 290 (seated on a washer 292 which engages a shoulder 294 in bore forming the chamber 282) upon the end of a slidable piston member 284 to the end of which is connected a control arm 286 by a universal or ball joint connection 288. A bent leaf spring 297 having one end fixed in a notch 301 in housing 18 with the other end bifurcated to provide a square notch matching the cross section of arm 286 is provided. The square notch engages a transverse recess 305 in the top wall of control arm 286 and straddles the arm to hold the arm 286 against turning and to bias it downwardly against the cams 299.

Disposed at the free end of the control arm 286 is a transverse shaft 298. As best shown in FIG. 2, the shaft 298 follows a pair of identical cams 299 of compound cam assembly 300 which straddle the cam 278 and are locked thereto for rotation with shaft 302 on which spur gear 304 is also fixedly secured. The spur gear 304 is in turn driven by the drive pinion 306 at one-half the speed thereof. Pinion 306 is in turn fixedly mounted on stub shaft 15 (FIG. 4).

Injection plunger 232 engages the flat top surface of the control arm 286 so as to be driven upwardly when the cam lobes of cams 299 move the cam follower shaft 298 upwardly to pressurize the fuel and cause the injection of a charge of fuel into the combustion chamber 248.

Adjustable stop 310 may be axially adjusted and serves as a variable stop to limit the downward movement of the control arm 286 dependent upon the relative axial position of control arm 286 which in turn is dependent upon the control pressure in chamber 282 as regulated by the speed of the engine and regulating valve 216. As illustrated in FIG. 6 where the control arm 288 is shown in its advanced position, it will be apparent that as the control arm 286 moves to the left with increased engine speed (and control pressure) the stop 310 will reduce the maximum downward travel of the end of control arm 286 thereby reducing the quantity of fuel which may enter the high pressure charge chamber 230 by limiting the downward movement of the injection plunger 232. Thus, by shaping the generally tapered ends 310a of the stop 310 and 286a of control arm 286, the desired torque curve for a particular engine may be provided. Alternatively, the tapered ends 310a of stop 310 may be utilized to provide for excess fuel for starting when the control arm 286 is at the extreme right, and may provide both a torque curve and excess starting fuel where the slope of end portion 310b is increased, while the remainder of the end of stop 310 may be shaped to provide the desired torque curve. A lock nut 314 is provided to hold the stop 310 in adjusted position.

Referring now to FIGS. 8A, 8B, and 8C, in conjunction with FIG. 6, the operation of the engine will be briefly discussed.

The gear ratio between gears 304 and 306 is 2:1 so that a half revolution of cam shaft 302 corresponds to a full revolution of the crankshaft.

FIG. 8A illustrates the position of the cams at the beginning portion of the exhaust stroke with the monovalve fully open. The roller 276 is in engagement with the lobe of the cam 278 and holds the bifurcated end 270 of the lever 272 downwardly to maintain the exhaust valve 164 in open position. During the exhaust stroke, the transverse shaft 298 engages the trailing side of the cam lobes of cams 299 so as to permit the injection plunger 232 to move downwardly until it reaches the cylindrical portion of the cams which is of a radius to insure that the injection plunger may move downwardly at least as fast as the sleeve 211 to prevent a secondary injection of fuel. After the exhaust stroke is over the monovalve 164 continues to be held open by the cam lobe of cam 278 until after a new charge of combustion air is taken into the combustion chamber during the intake stroke of the engine.

FIG. 8B shows the cam at the beginning of the compression stroke with the monovalve 164 fully closed. At this time the roller 276 has returned to the cylindrical lower portion of the cam 278 so that the sleeve 211 and the valve actuating rod 240 are at their top positions to enable the valve 164 to be fully closed. During this period of time the injection plunger 232 is free to move outwardly relative to the sleeve 211 to receive a quantity of metered fuel as determined by the metering valve 229 of the governor.

As shown in FIG. 8C the leading surface of the cam lobes of cams 299 engages the transverse shaft 298 of the control arm 286 to begin the injection stroke by causing relative upward movement of the injection plunger 232 and the sleeve 211 to begin the injection of fuel into the compression chamber 248 of the engine. After the injection plunger 232 is moved to its top most position (FIG. 6), the injection of fuel into the compression chamber 248 terminates and the power stroke begins with the valve 164 closed and the sloping trailing surface of cams 299 permitting the injection plunger 232 to retract.

A feature of this invention is that the priming of the fuel system prior to starting is readily accomplished by the simple expedient of pulling the plunger 224a of the accumulator 224 to provide a feed pressure to the pumping chamber 230. The position of the plunger will visually indicate that the feed pressure is available before cranking.

Moreover, the fuel injection system is one wherein the pressure in the high pressure pumping chamber 230 may be built up to operating levels and, in fact, a charge of fuel may be injected into the combustion chamber 248 by the simple expedient of depressing the spring-biased plunger 240a to depress the valve actuator rod 240 so that the injection plunger 232 engages the control arm 286 to produce injection pressure in the chamber 230.

FIGS. 10B, 10C, 10D and 10E illustrate modified forms of the monovalve support and fuel conduit assembly.

The form of FIG. 10B comprises a pair of leg members 350 which are hollowed out at 352 to provide a pair of spaced apart resilient spring members rigidly connected together at their ends. The leg members 350 straddle and are separated from a central leg member 364 by a pair of slits 356 which may also be hollow to provide spaced apart spring members rigidly connected together at their ends. The apertures 358 are provided to mount the support assembly on the cylinder head cap of an engine with the monovalve and nozzle assembly 24 mounted in the aperture 360 (which is aligned with apertures 358) in the same manner as hereinbefore described in connection with the embodiment of FIG. 10A. An aperture 362 in the end of the arm 364 is provided to receive the actuating rod and conduit member 240 to actuate the valve and deliver fuel to the nozzle in the manner hereinbefore described.

FIG. 10C illustrates another form of the monovalve support and fuel conduit assembly wherein the rings 154c replace the ring 154 of the embodiment of FIG. 10A. In the embodiment of FIG. 10C, the ring member is provided with a plurality, illustrated as being 4, of radial spring members 154d connected at the center and is provided with apertures 154e which are rigidly mounted on the cylinder cap whereby the vertical flexure primarily occurs in the radial arms 154d which are apertured at the center 154f thereof to support the monovalve and nozzle assembly 24. The support arm 158c is provided with a conduit for delivery of fuel to the nozzle and is apertured at its outer end 158d to receive the actuating rod and conduit member 240.

The embodiment of FIG. 10D includes a pair of superposed spaced apart parallel serpentine spring members which are rigidly secured to the engine by fasteners in the outer apertures 370 and is provided with a support arm 158e which functions and is connected in the same manner as support arm 158.

The embodiment of FIG. 10E is another form of ring member similar to the embodiment of FIG. 10A and is supported by passing the U-bolts 152 therethrough in the same manner as in FIG. 10A. The embodiment of FIG. 10E is provided with a support arm 158 which may be identical in form and function to the identical part in the embodiment of FIG. 10A.

Referring now to FIGS. 11A to 11G inclusive, there is shown a plurality of primary combustion chambers wherein the turbulence is maximized at top dead center of the piston. In the embodiment of FIG. 11A, the primary combustion chamber 248a is formed by a concentric recess in the top of the piston head concentric with the axis of the piston and the nozzle and valve assembly. The lower wall is formed with a generally conical protuberance which aids in swirling the air as a piston approaches top dead center. Moreover, the primary combustion chamber 248a does not extend the full width of the piston to leave facing walls of the piston and piston 31a and the piston head 22a. As shown, chamber 248a has a diameter slightly less than one-half the diameter of piston 31a. These facing walls approach each other to provide a minimum clearance of say 30 mils to avoid contact when the piston reaches top dead center. It will thus be seen that as the piston approaches top dead center, air between the facing walls will flow radially inwardly into the combustion chamber 248 to produce a turbulence therein which is maximum at top dead center.

The design of FIG. 11B includes the same combustion chamber, piston and piston head construction of the embodiment shown in FIG. 2 with the combustion primary chamber 248 formed by the cap 22. It will be apparent that this design likewise produces a radial movement of the air into the combustion chamber 248 as the piston approaches top dead center to provide maximum turbulence at that time. By providing the primary combustion chamber in the cylinder head, the heat conducted to the piston is minimized.

The embodiment of FIG. 11C is generally the same as that of FIG. 11B but includes a stepped boss 31b concentrically mounted on the head of the piston and projecting into the chamber 248 at top dead center to cause small eddy currents of air directed against the stepped walls of the stepped boss 31b to provide increased turbulence.

The design of FIGS. 11D and 11F is also similar to the design of FIB. 11B but includes a generally conical boss 31c concentrically on the top of the piston and projecting into the combustion chamber 248 at top dead center. As shown in the top view of the piston in FIG. 11F, the side walls of the boss 31c constitute a plurality, shown as 3, spiral surfaces to produce a swirling spiral motion of the air squeezed into the combustion chamber 248 as the piston approaches top dead center.

In the design of FIGS. 11E and 11G, the top of the piston is provided with a plurality of deflector ribs 31d which are disposed nonradially and extend from the outer portion of the top wall of the piston generally toward the center thereof. In this design, the cylinder cap 22e is provided with grooves 31e to receive the ribs 31d at top dead center. A generally conical projection 31f at the center of the piston is also provided in this embodiment to produce an upward swirling of the air to further increase the turbulence at top dead center.

As will be apparent to persons skilled in the art, various modifications and adaptations of the structure above-described will become readily apparent without departure from the spirit and scope of the invention, the scope of which is defined in the appended claims.

I claim:

1. A fuel injection subassembly for an internal-combustion engine comprising a housing, a hollow actuating rod for opening and closing an engine valve connected to a pump sleeve mouted in a bore in the housing for reciprocating movement, a first cam for actuating said pump sleeve, said pump sleeve having an aperture defining a pumping chamber therein, an injection plunger mounted for reciprocating movement within said aperture, a second cam for reciprocating the plunger relative to the sleeve to deliver a pulse of fuel to the passage of said actuating rod upon relative axial movement of the plunger and the sleeve.

2. A device as recited in claim 1 wherein the plunger retracts after the delivery of the pulse of fuel at a speed at least as fast as the simultaneous movement of the pump sleeve under all fuel delivery conditions.

3. A device as recited in claim 1 wherein the cam lift for the plunger is at least as great as the cam lift for the pump sleeve under all fuel delivery conditions.

4. A device as recited in claim 1 wherein an injection control arm is interposed between the second cam and the plunger.

5. A device as recited in claim 4 wherein said control arm is movable in a direction generally tangential to cam rotation an amount correlated with engine speed to change the timing of the delivery of pulses of fuel by the pump.

6. A device as recited in claim 5 wherein said control arm is movable to advance the time of injection with increased speed.

7. A device as recited in claim 6 including a metering valve upstream of said pumping chamber for metering fuel under pressure correlated with engine speed, said control arm being operatively connected to a fuel passage upstream of the metering valve.

8. A device as recited in claim 4 wherein a stop engageable with the control arm to limit the maximum movement of the injection plunger to an amount correlated with engine speed to vary the maximum capacity of the pumping chamber according to engine speed.

9. A device as recited in claim 8 wherein the stop is adjustable and is shaped relative to the engaging portion of the arm to produce the desired torque curve for the associated engine.

10. A device as recited in claim 9 wherein the stop is axially aligned with the arm and the shaped surfaces for producing the desired torque curve are formed on the ends of the arm and stop respectively.

11. A device as recited in claim 9 wherein the stop and the engaging portion of the arm are shaped to provide excess fuel delivery by the pump under starting conditions.

12. A fuel injection subassembly for a compression-ignition engine comprising a housing providing a bore, a sleeve having a central aperture to define a pumping chamber mounted for reciprocating movement in the bore, an injection plunger mounted in said aperture for reciprocating movement relative to the sleeve, a first cam for reciprocating the sleeve in the bore, a second cam for reciprocating the plunger independently of the sleeve, said pumping chamber having an inlet for the delivery of fuel thereto and an outlet for the discharge of pressurized fuel therefrom, and one-way valves in said inlet and said outlet to prevent the reverse flow of fuel, said sleeve further having a portion spaced from the wall of said bore to provide an annulus defining a second pumping chamber, said second pumping chamber having a fuel inlet and a fuel outlet each including one-way valves to prevent reverse flow of fuel, said second pumping chamber being disposed upstream of the first-mentioned pumping chamber, and a metering valve connected to the outlet of the second pumping chamber.

13. A device as recited in claim 12 wherein said housing bore is stepped to provide the second pumping chamber.

14. A device as recited in claim 12 wherein the fuel in said first pumping chamber is pressurized when said sleeve moves in one direction relative to the injection plunger and the fuel in the second pumping chamber is pressurized when the sleeve moves in the other direction.

15. A device as recited in claim 12 wherein a fuel pressure regulator and accumulator are connected to the output of the second pumping chamber upstream of the metering valve.

16. A device as recited in claim 14 wherein a timing control arm is interposed between the injection plunger and its operating cam, said control arm being movable in a direction generally tangent to the cam to advance the timing of the pumping stroke of the injection plunger relative to the pressurization of the fuel in the second pumping chamber.

17. A device as recited in claim 16 wherein a stop is engageable with the timing control arm to limit the maximum pumping stroke of the injection plunger by an amount correlated with engine speed.

18. A device as recited in claim 17 wherein said timing control arm is acted upon by a fuel pressure which increases with increased engine speed, said stop having a nonlinear surface engageable with said arm with the portion thereof engaging the arm under starting conditions having a steeper slope relative to said arm to provide excess fuel for starting.

19. A device as recited in claim 17 wherein the engaging portions of said stop and said control arm are shaped to produce a torque curve correlated with the requirements of the associated engine.

20. A device as recited in claim 12 including a governor mounted in the housing to control said metering valve.

21. A device as recited in claim 20 wherein said governor includes a rotating metering valve member slidably mounted in a cylindrical sleeve containing the metering port to control the opening thereof, said rotating valve member including a portion of noncircular cross section aligned with an annulus in the inner wall of said sleeve, said annulus having a discharge port bypassing the metering valve whereby the noncircular portion serves to centrifugally separate particles entrained in the fuel upstream of the metering port.

22. A device as recited in claim 21 wherein the rotating valve member includes an annular wall forming an end of said noncircular portion, said annular wall being slightly spaced from the inner periphery of the sleeve to provide a restricted annular passage between the noncircular portion and the metering port.

23. A device as recited in claim 1 wherein said sleeve is adjustable relative to said hollow actuating rod to adjust the maximum opening of the engine valve.

24. A fuel injection subassembly for an internal combustion engine comprising a housing, a hollow actuating rod for opening and closing an engine valve connected to a pump sleeve mounted in a bore in the housing for reciprocating movement, a first actuator for actuating said pump sleeve in timed relation with the engine, said pump sleeve having an aperture defining a pumping chamber therein, an injection plunger mounted for relative movement within said aperture, a second actuator for actuating the plunger relative to the sleeve in timed relation with the engine to deliver a pulse of fuel to the passage of said hollow actuating rod.

References Cited

UNITED STATES PATENTS

| | | | |
|---|---|---|---|
| 1,612,031 | 12/1926 | Spina | 123—140 |
| 1,620,870 | 3/1927 | Carrey | 230—201 XR |
| 1,620,846 | 1/1935 | Paulin et al. | 123—140 |
| 2,053,057 | 9/1936 | Woolson | 123—139 |
| 2,136,960 | 11/1938 | Wurtele | 123—139 XR |
| 2,280,386 | 4/1942 | Dickson | 123—139 |
| 2,818,053 | 12/1957 | Shallenberg | 123—140 |
| 3,294,075 | 12/1966 | Gratzmuller | 123—139 |

LAURENCE M. GOODRIDGE, *Primary Examiner.*

U.S. Cl. X.R.

103—2; 123—32, 139